Patented Jan. 14, 1941

2,229,018

UNITED STATES PATENT OFFICE

2,229,018

POLY-CYCLOHEXYL-NAPHTHALENES

Frank B. Smith and Harold W. Moll, Midland, Mich., assignors to The Dow Chemical Company, Midland, Mich., a corporation of Michigan No Drawing. Application September 29, 1938, Serial No. 232,288

1 Claim. (Cl. 260—668)

This invention concerns certain new chemical compounds, namely cyclohexyl-naphthalenes containing at least three cyclohexyl groups per naphthalene nucleus. All such compounds are herein referred to as "poly-cyclohexyl-naphthalenes." The invention also concerns mixtures of such compounds.

The poly-cyclohexyl-naphthalenes and their mixtures vary in physical properties from very viscous, high-boiling liquids to glass-like resinous solids, depending upon the number of cyclohexyl groups which have been introduced into the naphthalene molecule. They are substantially insoluble in water, but are readily dissolved by a number of organic solvents, such as carbon tetrachloride, toluene, benzene, chlorbenzene, etc. They may be employed as plasticizing agents for cellulose ethers, e. g. ethyl cellulose, benzyl cellulose, etc., to prepare flexible films and foils having very high surface hardness. The lower cyclohexylated naphthalenes, i. e. mono- and di-cyclohexyl-naphthalenes, have little, if any, plasticizing action on cellulose ethers.

The new poly-cyclohexyl-naphthalenes are prepared by reacting naphthalene with a cyclohexylating agent, such as cyclohexene, cyclohexyl bromide, cyclohexyl chloride, etc., in the presence of an alkylation catalyst, e. g. aluminum chloride, iron chloride, boron trifluoride, activated bleaching earths such as Retrol and Tonsil, etc. In a preferred mode of operation, the new products are prepared by reacting cyclohexene with naphthalene employing Retrol or aluminum chloride as the catalyst. The yield of poly-cyclohexyl-naphthalenes is highest when a molecular excess of the cyclohexylating agent is employed. We prefer to employ approximately 2–4 moles of the cyclohexylating agent per mole of naphthalene. The amount of catalyst varies with the particular reactants employed and the conditions under which the reaction is carried out, but we usually employ between about 0.02 and 0.10 part by weight of catalyst per part of naphthalene.

The reaction is conveniently carried out by adding the cyclohexylating agent with stirring to a heated mixture of naphthalene and the catalyst, and thereafter continuing the heating and stirring until reaction is complete. The reaction temperature is usually between about 150° C. and about 250° C., although somewhat higher temperatures may be employed. The reaction is usually complete in from 1 to 10 hours and, if desired, the time may be shortened by carrying out the reaction under pressure in a closed vessel. When the reaction is complete, the catalyst is removed and the mixture is fractionally distilled under vacuum.

The fraction distilling at temperatures between about 220° C. and about 312° C. under 20 millimeters pressure is a viscous yellow liquid, consisting almost entirely of a mixture of mono- and di-cyclohexyl-naphthalenes. Such liquid mixture constitutes a valuable by-product which may be further reacted with a cyclohexylating agent to prepare the more highly substituted compounds, or which may be employed as such as a dielectric fluid, etc. The poly-cyclohexyl-naphthalenes are obtained as a very viscous liquid mixture distilling at temperatures above about 312° C. at 20 millimeters pressure. If desired, such mixed product may be employed directly as a plasticizing agent or it may be further fractionally distilled to obtain fractions representing isomeric tri-cyclohexyl-naphthalenes, tetra-cyclohexyl-naphthalenes, etc. The fraction distilling at temperatures between about 312° C. under 20 millimeters pressure and about 305° C. under 5 millimeters pressure consists essentially of isomeric tri-cyclohexyl-naphthalenes and is particularly valuable as a plasticizing agent for ethyl cellulose compositions.

The following examples illustrate several ways in which the principle of the invention has been applied, but are not to be construed as limiting the same:

Example 1

A mixture of 128 grams (1.0 mole) of naphthalene and 6.4 grams (5 per cent by weight) of Retrol was heated at a temperature of about 150° C. until all of the residual water contained in the Retrol had been driven off. 180.4 grams (2.2 moles) of cyclohexene was then added, with stirring, at such a rate that gentle refluxing occurred. The heating was continued for about ½ hour after which time the reaction mixture was allowed to cool and the catalyst was filtered from the liquid. The filtrate was then distilled under vacuum to obtain the following fractions:

| Fraction | 1 | 2 | 3 | 4 | 5 |
|---|---|---|---|---|---|
| Product | Unreacted naphthalene. | Intermediate fraction. | Mono- and di-cyclohexyl-naphthalenes. | Tri-cyclohexyl-naphthalenes | Higher cyclohexylated naphthalenes. |
| Appearance | Water-white liquid | Clear viscous liquid. | Very viscous yellow fluorescent liquid. | Light yellow resin | Dark amber resin. |
| Boiling range | Up to 175° C. at 20 mm. | 175°–220° C. at 20 mm. | 220°–312° C. at 20 mm. | 312° C. at 20 mm. to 305° C. at 5 mm. | Above 305° C. at 5 mm. |
| Specific gravity | | | | 1.026 at 130/130° C | |

Example 2

330 grams (4.0 moles) of cyclohexene was added gradually with stirring over a period of ½ hour to a heated mixture of 128 grams (1.0 moles) of naphthalene and 3.3 grams of anhydrous aluminum chloride. During the addition of cyclohexene the temperature of reaction was maintained at approximately 150°–175° C. The reaction mixture was then cooled, and the catalyst was destroyed by acidifying with approximately 200 grams of dilute hydrochloric acid. The acidified mixture was extracted with about 200 grams of toluene and the toluene extract was washed several times with water to remove traces of acid. The toluene was then distilled off and the residue was fractionally distilled under vacuum as follows:

| Fraction No. | Boiling range | Yield (Grams) | Product |
|---|---|---|---|
| 1 | 23°–312° C. at 20 mm. | 35 | Unreacted naphthalene and mono- and dicyclohexyl - naphthalenes. |
| 2 | 312° C. at 20 mm. to 305° C. at 5 mm. | 87 | Tri - cyclohexyl - naphthalenes. |
| 3 | 305° C. at 5 mm. to 330° C. at 3 mm. | 80 | Tetra-cyclohexl-naphthalenes. |
| 4 | Above 330° C. at 3 mm. | 150 | Higher cyclohexylated naphthalenes. |

Fraction No. 3 was a light yellow brittle resin, having a density of approximately 1.016 and a softening point of 95°–96° C.

Other modes of applying the principle of our invention may be employed instead of those explained, change being made as regards the methods herein disclosed or the materials employed, provided the product claimed in any of the following claims be employed.

We therefore particularly point out and distinctly claim as our invention:

A mixture consisting substantially of isomeric tetracyclohexyl-naphthalenes, said mixture being a yellow brittle resin distilling between approximately 305° C. under 5 mm. pressure and approximately 330° C. under 3 mm. pressure.

FRANK B. SMITH.
HAROLD W. MOLL.